United States Patent [19]

Lowe

[11] 4,029,363
[45] June 14, 1977

[54] FLEXIBLE JUNCTION IN A SYSTEM FOR FLUIDIZING GRANULAR MATERIALS

[75] Inventor: Richard L. Lowe, Glenshaw, Pa.

[73] Assignee: Aluminum Company of America, Pittsburgh, Pa.

[22] Filed: Aug. 5, 1976

[21] Appl. No.: 711,955

[52] U.S. Cl. ................................. 302/29; 138/28; 285/227; 302/64

[51] Int. Cl.² .................. B65G 53/52; B65G 53/20

[58] Field of Search ............... 302/29, 31, 45, 51, 302/52, 57, 64; 285/227; 138/28; 34/57 A, 57 C; 432/15, 58

[56] References Cited

UNITED STATES PATENTS

| | | | |
|---|---|---|---|
| 2,529,366 | 11/1950 | Bauer | 432/15 |
| 3,626,986 | 12/1971 | Rapp et al. | 302/64 |
| 3,735,498 | 5/1973 | Suzukawa et al. | 34/57 R |
| 3,870,374 | 3/1975 | Wentzel et al. | 302/29 |

*Primary Examiner*—Evon C. Blunk
*Assistant Examiner*—Jeffrey V. Nase
*Attorney, Agent, or Firm*—William J. O'Rourke, Jr.

[57] ABSTRACT

An expandable junction is provided for connecting primary enclosures in a system for fluidizing granular materials. The enclosures have permeable floors therein and a fluidizing medium is supplied upwardly through the floors. The junction comprises a secondary enclosure spaced between and at a lower elevation than the primary enclosures, having a permeable floor therein, and a fluidizing medium is supplied upwardly through the floor, and juxtaposed flexible tubes connecting the secondary enclosure with the primary enclosures at a location closely adjacent the end of the permeable floor in each primary enclosure.

6 Claims, 2 Drawing Figures

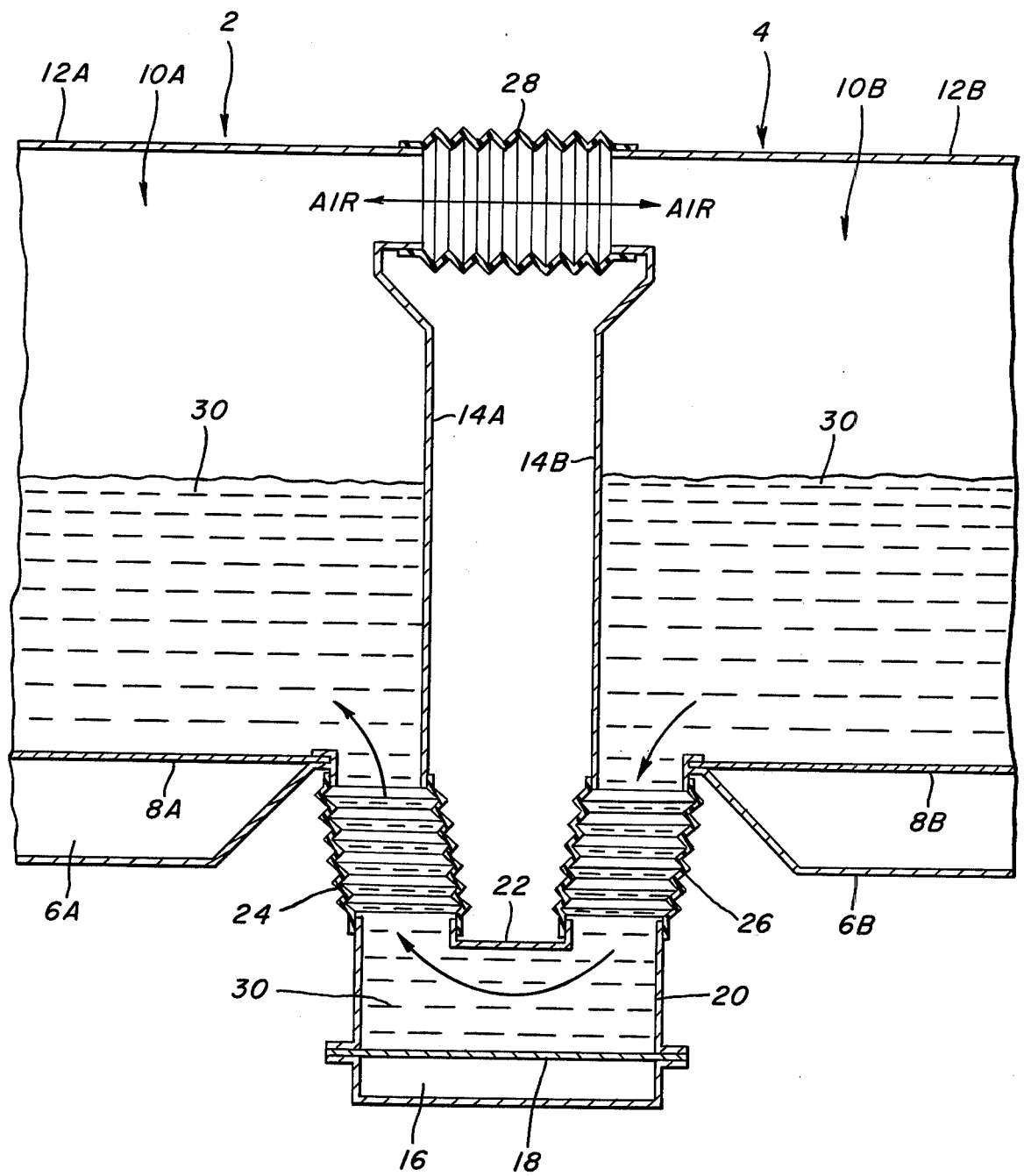

FLEXIBLE JUNCTION IN A SYSTEM FOR FLUIDIZING GRANULAR MATERIALS

BACKGROUND OF THE INVENTION

1. Field of Invention

The present invention relates to systems for fluidizing granular materials and more particularly to an expansion joint for connecting fluidized conveyors or fluidized bed sections.

2. Description of the Prior Art

As disclosed in Wentzel et al. U.S. Pat. No. 3,870,374, it is well known to transport particulate material such as alumina in a fluidized conveyor. Such a fluidized conveyor is created by flowing a fluid, usually a gas such as air, upwardly through suitably sized solid granular material at a velocity sufficiently high to bouy the granular particles. Fluidization imparts to the bed of granular particles a character similar to that of a liquid.

The longer fluidized conveyors of the prior art slope downwardly at an angle of about 3° to 5° from horizontal. Typically, these conveyors are anchored to the structural support beams in the buildings or to other permanent structures. In such longer conveyors expansion and contraction occurs with changes in temperature. The temperature changes occur frequently due to start and stop conditions with hot and cold granular materials, and due to daily fluctuations in atmospheric temperatures. As the lengths of such conveyors have increased, it has become necessary to provide junctions at certain intervals along the length of the conveyors in order to absorb expansion and contraction between stationary structural support beams and the like.

Junctions of the prior art have consisted primarily of overflow discharge passages which would permit the fluidized material to exit one conveyor section and fall under the influence of gravity downwardly into another conveyor section positioned therebelow and continue the fluidized flow. A similar discharge mechanism is disclosed in Bauer U.S. Pat. No. 2,529,366.

The primary problem with the junctions of the prior art is that the two in-line fluidized conveyors do not maintain their in-line elevation through a junction. For excessively long conveyors of the prior art having more than one such junction, the total elevation drop could be significant enough to cause construction problems. For instance, the hopper that feeds the granular material onto the conveyor may be 25 feet or more in height, and each junction may require an elevation drop of 2 feet or more, and further a downward slope of 3° to 5° for the conveyor may require about 7 feet in elevation for every 100 feet in length. With such elevation changes, it is readily apparent that a significant amount of overhead clearance is required for the longer fluidizing systems of the prior art.

Accordingly, a new and improved junction is required which will absorb expansion, contraction, and all other relative movement of fluidized conveyor and bed sections and not require an elevation differential.

SUMMARY OF THE INVENTION

This invention may be summarized as providing an expandable junction for connecting primary enclosures in a system for fluidizing granular materials. The enclosures have permeable floors therein and means for supplying a fluidizing medium upwardly through the floors. The junction comprises a secondary enclosure spaced between and at a lower elevation than the primary enclosures, having a permeable floor therein and means for supplying a fluidizing medium upwardly through the floor, and juxtaposed flexible tubes connecting the secondary enclosure with the primary enclosures at a location closely adjacent the end of the permeable floor in each primary enclosure.

Among the advantages of the subject invention is the provision of a new and improved expansion joint for fluidized conveyors and fluidized beds which can absorb the expansion, contraction and other relative movement in a fluidized system.

Another advantage of the present invention is the provision of a junction for fluidized conveyor sections which does not require the level of the downstream conveyor section to be lower than that of the upstream conveyor section.

It follows that an objective of the present invention is the provision of a junction for two substantially level fluidized beds through which fluidized material may flow in either direction.

Another objective of this invention is the provision of a junction for fluidized conveyors or beds in which the fluidizing medium in the joined conveyors or beds may readily be supplied with air from a common source.

A further advantage of the subject invention is to provide a junction through which fluidized material may flow without significantly changing the level of fluidized material in the conveyor sections on both sides of the junction.

The above and other objectives and advantages of this invention will be more fully understood and appreciated from the following detailed description and the drawings appended hereto.

BRIEF DESCRIPTION OF THE DRAWINGS

FIG. 2 is a partial cross-sectional view of the junction of FIG. 1 expanded in accordance with the present invention.

DESCRIPTION OF THE PREFERRED EMBODIMENTS

Figure 1:
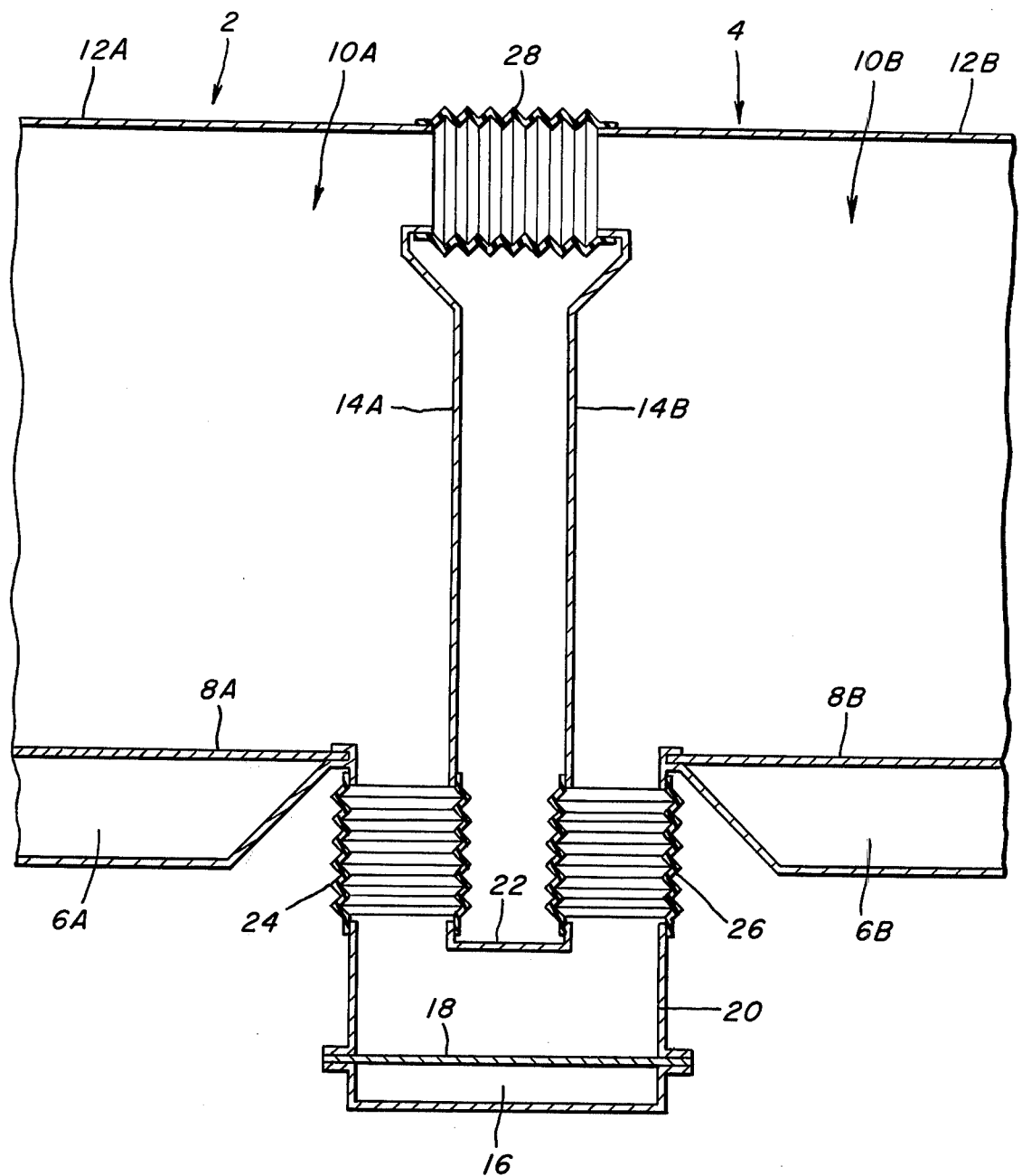
FIG. 1 is a partial cross-sectional view of a junction of the present invention.

Referring particularly to the drawings, FIG. 1 illustrates a partial cross-sectional view of a junction of the present invention for connecting first and second fluidized enclosures in the form of conveyor sections 2 and 4. One conveyor section 2 lies in the same general plane as another conveyor section 4. The conveyor sections 2 and 4, each have a permeable floor, 8A and 8B respectively, and means for supplying a fluidizing medium upwardly through the floors, such as air chambers, 6A and 6B respectively. The conveyor sections 2 and 4 are also provided with adjacent end walls 14A and 14B respectively.

The conveyor sections 2 and 4, shown in FIG. 1, are end-to-end or in-line. By "end-to-end " or "in-line " it is meant that at least two conveyor sections are positioned such that the end walls 14A and 14B are adjacently disposed with the sections in substantially the same plane. The conveyor sections shown in FIG. 1 extend substantially horizontally along such plane. It should be noted that in addition to connecting two level conveyor sections at the same elevation, the junction of the present invention is equally applicable for connecting downwardly sloping sections, even sections having different slopes. Also, the junction of the present invention may be employed to connect sections which are disposed at angles to one another in the horizontal plane to provide for turns in level or sloping fluidized systems of short or relatively long length. Additionally, the junction of the present invention may connect a multiplicity of fluidized sections which converge at or near the same plane.

The junction of the present invention is illustrated in FIG. 1 as comprising a secondary enclosure 20 spaced between and at a lower elevation than the conveyor sections 2 and 4. The secondary enclosure 20 also has a permeable floor 18 therein constructed of any material having a suitable permeability such as ¼ inch thick woven cloth fabric.

The junction further includes means for supplying a fluidized medium, such as air, upwardly through the floor 18 in the secondary enclosure 20. As shown in the drawing, a chamber 16 may be provided below the permeable floor 18 which can be supplied with a gas, such as air, externally by known means. As the pressure of the air in the chamber 16 increases the air necessarily passes upwardly through the permeable floor 18 to fluidize granular material thereon.

A pair of juxtaposed flexible tubes 24 and 26 connect the secondary enclosure 20 with conveyor sections 2 and 4 at locations closely adjacent the end of the permeable floors 8A and 8B. The bottom ends of the flexible tubes 24 and 26 are preferably connected to the secondary enclosure 20 at an upper portion 22 of the enclosure 20 overlying the permeable floor 18. It should be understood by those skilled in the art that the flexible tubes 24 and 26 should be constructed of material such as rubber which will be able to flex, stretch or bend and thereby absorb any expansion and/or contraction that may occur in the fluidized system without disconnecting from the system.

In a preferred embodiment of the present invention the junction is provided with a third flexible tube 28 connecting the upper portions of the large conveyor sections 2 and 4. The third flexible tube 28 should be constructed of suitable expandable material as the other flexible tubes 24 and 26, and should be positioned such that only exhaust air and dust may pss therethrough between the conveyor sections. Accordingly, this third flexible tube 28 is connected to the conveyor sections 2 and 4 near their top walls 12A and 12B so the tube 28 is located within the air space 10A and 10B. This tube 28 is located above the levels of fluidized granular material in the connected sections so fluidized granular material will not enter the tube 28. Provision of the third flexible tube 28 connects the conveyor sections 2 and 4 to permit fluidizing air from both sections to be exhausted through a common vent, not shown. In FIG. 2, the arrow through the flexible tube 28 indicates that the exhaust air may flow freely between the air space 10A and 10B in adjacent conveyor sections 2 and 4.

When one or both conveyor sections 2 and 4 contract, for one reason or another, the gap between the end walls 14A and 14B increases. To accommodate such increase in the gap between end walls 14A and 14B, the flexible tubes 24, 26 and 28 stretch or flex to avoid breaking the connection between the sections 2 and 4 and to maintain fluidization, as illustrated in FIG. 2. It will be understood by those skilled in the art that the flexible tubes 24, 26 and 28 are able to flex or bend in directions other than that shown in FIG. 2 in order to absorb horizontal, vertical or angular movement of section 2 and/or 4.

In the operation of the junction illustrated in FIG. 2, fluidized material 30 flows from one conveyor section 4 through the junction into the other conveyor section 2. With air pressure applied to chambers 6A and 6B, and preferably with a slightly higher air pressure applied to chamber 16, the granular material is fluidized 30 throughout the system. The fluidized material 30, behaving like a liquid, flows downwardly into the secondary enclosure 20 from one conveyor section 4, fills the secondary enclosure 20 and flows upwardly into the other conveyor section 2. Such flow pattern, as indicated by the arrows in FIG. 2, in much like that of a manometer. It will be understood that the direction of flow of fluidized granular material may be opposite that illustrated by the arrows in FIG. 2.

The air chambers 6A and 6B of both conveyor sections 2 and 4 may be supplied with air from the same source. In such case, another flexible tube (not shown) may be provided to connect the air chambers 6A and 6B so the air pressure in each section will be equal. At such equal pressures, the level of fluidized material in both conveyor sections 2 and 4 will be substantially equal under ideal conditions. However, there may be a slightly lower level of fluidized material 30 in the downstream section 2, as determined by the direction of flow, shown in FIG. 2, as a result of fluid friction created during the flow through the junction. This difference in level is very slight and does not hinder the operation of the fluidized system.

If the air chambers 6A and 6B of the two conveyor sections 2 and 4 are supplied with air from separate sources, the air pressure in the sections 2 and 4 may be different. In that case, the level of the fluidized material 30 may be separately varied in each of the conveyor sections 2 and 4 as may be desired in certain fluidizing applications. It will be understood by those skilled in the art that the cross-sectional area of the flexible tubes 24 and 26 does not affect the difference between the levels of fluidized material 30, except to the extent that excessively small tubes may cause a level differential due to added friction.

In a preferred embodiment of the present invention, the junction has been illustrated and described with reference to a substantially level fluidized system. In such a system, the fluidized material may flow in either direction through the junction. For example, the fluidized material can flow either from section 4 into section 2 or from section 2 into section 4. This invention also facilitates the provision of multiple discharge points in both sections 2 and 4 in systems of relatively long lengths. Those discharge points could operate in any combination depending on the demand for the granular material. The demand may readily fluctuate and be greater to either side of the junction during routine operation of the fluidized system. The junction of the present invention permits flow in either direction while the overflow discharge passages of the prior art would permit flow in only one direction. In the discharge passages of the prior art, once the material flows downwardly out of one section, it cannot return to that section.

Whereas the particular embodiments of this invention have been described above for purposes of illustration, it will be apparent to those skilled in the art that numerous variations of the details may be made without departing from the invention.

What is claimed is:

1. In a system for fluidizing granular materials including primary enclosures having permeable floors therein and means for supplying a fluidizing medium upwardly through said floors, a flexible junction connecting said primary enclosures comprising:

a secondary enclosure spaced between and at a lower elevation than the primary enclosures, having a permeable floor and means for supplying a fluidizing medium upwardly through the permeable floor; and juxtaposed flexible tubes connecting the secondary enclosure with each of the primary enclosures, the connection with the primary enclosures located contiguous to the end of the permeable floor in each primary enclosure.

2. A junction as set forth in claim 1 further comprising a third flexible tube connecting the upper portions of said primary enclosures.

3. A junction as set forth in claim 1 wherein said means for supplying a fluidizing medium upwardly through the permeable floor in the secondary enclosure is independent of the means for supplying a fluidizing medium upwardly through the permeable floor in the primary enclosures.

4. A junction as set forth in claim 1 wherein said primary enclosures extend substantially horizontally so fluidized material can flow through said junction in either direction.

5. An expandable connection between fluidized conveyor ducts having permeable floors therein and adjacently disposed ends at approximately the same elevation and means for supplying fluidizing medium upwardly through such floors, said connection comprising an enclosure having a permeable floor therein disposed below the elevation of the permeable floors in the conveyor ducts, means for supplying fluidizing medium upwardly through the floor in said enclosure and flexible tubes connecting said enclosure with each of said conveyor ducts at a location closely adjacent the end of the permeable floor in each such duct.

6. An expandable connection as set forth in claim 5 in which said tubes open into said enclosure at closely spaced locations above the permeable floor of said enclosure to insure fluidization of granular material in said enclosure between the tubes for flow of the material between the ends of said conveyor ducts.

* * * * *